(12) United States Patent
Battenfeld et al.

(10) Patent No.: US 10,355,461 B2
(45) Date of Patent: Jul. 16, 2019

(54) STRIPPING TOOL AND METHOD FOR STRIPPING

(71) Applicant: WEZAG GmbH Werkzeugfabrik, Stadtallendorf (DE)

(72) Inventors: Kurt Battenfeld, Ebsdorfergrund/Wittelsberg (DE); Gernot Pontow, Neustadt-Speckswinkel (DE)

(73) Assignee: WEZAG GMBH WERKZEUGFABRIK, Stadtallendorf (DE)

( * ) Notice: Subject to any disclaimer, the term of this patent is extended or adjusted under 35 U.S.C. 154(b) by 14 days.

(21) Appl. No.: 15/719,094

(22) Filed: Sep. 28, 2017

(65) Prior Publication Data

US 2018/0109086 A1 Apr. 19, 2018

(30) Foreign Application Priority Data

Oct. 14, 2016 (EP) .................................... 16193973

(51) Int. Cl.
*B21F 13/00* (2006.01)
*H02G 1/12* (2006.01)

(52) U.S. Cl.
CPC ......... *H02G 1/1209* (2013.01); *H02G 1/1214* (2013.01); *H02G 1/1258* (2013.01)

(58) Field of Classification Search
CPC .. H02G 1/1221; H02G 1/1224; H02G 1/1265; H02G 1/1214; H02G 1/1209; H02G 1/1229

USPC ............ 30/91.2, 109, 111–112; 81/9.4, 9.41, 81/9.43, 9.44, 9.51

See application file for complete search history.

(56) References Cited

U.S. PATENT DOCUMENTS

| 3,151,510 | A | * | 10/1964 | Bunker | H02G 1/1295 30/90.6 |
| 4,327,609 | A | | 4/1982 | Resch | |
| 4,815,814 | A | * | 3/1989 | Ulijasz | G02B 6/245 174/71 R |
| 4,873,901 | A | * | 10/1989 | Stoehr | H01R 43/05 81/9.51 |
| 5,153,984 | A | * | 10/1992 | Beetz | H01R 43/042 29/751 |
| 5,398,413 | A | * | 3/1995 | Chen | H02G 1/1224 30/90.1 |
| 5,526,718 | A | * | 6/1996 | Hoffa | H02G 1/1256 81/9.51 |

(Continued)

FOREIGN PATENT DOCUMENTS

CN 101 431 223 A 5/2009
DE 28 48 445 A1 6/1980
(Continued)

*Primary Examiner* — Ghassem Alie
*Assistant Examiner* — Bharat C Patel
(74) *Attorney, Agent, or Firm* — Thomas | Horstemeyer, LLP

(57) ABSTRACT

The invention relates to a stripping tool, in particular stripping pliers. The stripping tool is here used for a multi-wired cable. According to the invention two pairs of stripping blades are used in the stripping tool. The two pairs of stripping blades are moved in preferably parallel planes (60, 61) besides one another. According to the invention it is possible to simultaneously strip the insulations of e.g. four conductors of a four-wired cable.

13 Claims, 16 Drawing Sheets

(56) References Cited

U.S. PATENT DOCUMENTS

| | | | | |
|---|---|---|---|---|
| 5,528,962 A | * | 6/1996 | Hoffa | H02G 1/1256 |
| | | | | 29/825 |
| 5,913,933 A | | 6/1999 | Beetz | |
| 5,924,200 A | * | 7/1999 | College | H02G 1/127 |
| | | | | 30/90.1 |
| 6,026,671 A | * | 2/2000 | Battenfeld | B25B 7/12 |
| | | | | 29/751 |
| 6,155,095 A | | 12/2000 | Beetz | |
| 6,612,147 B2 | * | 9/2003 | Beetz | B25B 7/12 |
| | | | | 7/128 |
| 6,618,885 B1 | * | 9/2003 | Blaustein | H02G 1/1214 |
| | | | | 7/107 |
| 6,823,766 B2 | * | 11/2004 | Bernardelle | H02G 1/1256 |
| | | | | 29/240 |
| 6,877,228 B2 | * | 4/2005 | Beetz | B25B 7/12 |
| | | | | 30/134 |
| 6,910,256 B2 | * | 6/2005 | Locher | H01R 43/05 |
| | | | | 29/564.4 |
| 8,161,789 B2 | * | 4/2012 | Battenfeld | H01R 43/042 |
| | | | | 72/409.07 |
| 8,296,956 B2 | * | 10/2012 | Battenfeld | H02G 1/1221 |
| | | | | 30/90.1 |
| 8,516,872 B2 | * | 8/2013 | Battenfeld | B25B 7/22 |
| | | | | 72/409.01 |
| 8,601,856 B2 | * | 12/2013 | Battenfeld | H01R 43/042 |
| | | | | 29/751 |
| 8,739,665 B2 | * | 6/2014 | DeGrace | H02G 1/1209 |
| | | | | 30/353 |
| 9,059,573 B2 | * | 6/2015 | Hedrick | H01R 43/0421 |
| 9,242,349 B2 | | 1/2016 | Battenfeld | |
| 9,583,904 B2 | | 2/2017 | Battenfeld | |
| 2006/0073734 A1 | * | 4/2006 | Delsaert | H02G 1/1212 |
| | | | | 439/607.01 |
| 2017/0113367 A1 | | 4/2017 | Zinser | |

FOREIGN PATENT DOCUMENTS

| | | |
|---|---|---|
| DE | 30 15 606 A1 | 5/1981 |
| DE | 39 28 196 A1 | 3/1990 |
| DE | 40 23 337 C1 | 10/1991 |
| DE | 689 23 071 T2 | 1/1996 |
| DE | 44 27 553 C2 | 6/1998 |
| DE | 298 03 336 U1 | 9/1998 |
| DE | 19 713 580 C2 | 12/1999 |
| DE | 198 32 884 C1 | 12/1999 |
| DE | 19 807 737 C2 | 6/2000 |
| DE | 100 56 900 C1 | 8/2002 |
| DE | 101 32 413 C2 | 7/2003 |
| DE | 101 40 270 B4 | 9/2004 |
| DE | 10 2005 003 617 B3 | 6/2006 |
| DE | 10 2005 003 615 B3 | 9/2006 |
| DE | 10 2007 038 626 B3 | 10/2008 |
| DE | 10 2008 058 168 A1 | 5/2010 |
| DE | 10 2011 052 967 B4 | 12/2013 |
| EP | 0 375 458 B1 | 6/1995 |
| EP | 1 258 960 A2 | 5/2002 |
| EP | 2 190 080 A2 | 11/2009 |
| EP | 2 672 580 A1 | 6/2012 |
| EP | 2 562 891 A1 | 8/2012 |
| EP | 2 905 848 A1 | 2/2014 |
| EP | 3 012 924 A1 | 10/2014 |
| EP | 3 159 088 A1 | 10/2015 |
| EP | 15 191 264.9 | 10/2015 |
| GB | 2 063 580 A | 6/1981 |

* cited by examiner

STRIPPING TOOL AND METHOD FOR STRIPPING

CROSS REFERENCE TO RELATED APPLICATIONS

This application claims priority to co-pending European Patent Application No. EP 16 193 973.1 filed Oct. 14, 2016.

FIELD OF THE INVENTION

The invention relates to a stripping tool for stripping a multi-wired cable and a method for stripping a multi-wired cable. Here, the invention can be used together with a cable having any cross-sectional geometry. The cable might e.g. be a flat cable or ribbon cable. However, preferably the cable is a round or circular cable. The cable comprises a plurality of conductors. In the cable the plurality of conductors are commonly covered by an outer insulation. The conductors each comprise an electrical wire. A wire can here be formed by a single strand or multiple strands. Furthermore, the conductors each comprise an insulation which covers the respective electrical wire. Here, the outer insulation and/or the insulation of the conductor might also comprise a protective sheet and/or a shielding. It is e.g. possible that the multi-wired cable comprises four conductors. However, within the framework of the invention the cable might also comprise a larger or smaller number of conductors.

For providing the electrical contact of the electrical wires with an electrical component or a plug generally an end of the outer insulation is to be removed for gaining access to the conductors. Subsequently the ends of the insulations of the conductors are removed. Then finally the establishing of the electrical contact of the wires in the end region of the wire freed from the insulation is possible, in particular by crimping a plug or a contact element to this end region.

Stripping tools are used for the stripping of conductors of the cable. Within the framework of the invention in particular a stripping machine, a stripping tool comprising a drive (in particular a pneumatic, hydraulic or electrical drive) or a manual stripping tool which is manually operated is subsumed under a stripping tool. Preferably, the stripping tool is embodied as stripping pliers which are actuated by two hand levers which are pivoted manually relative to each other.

BACKGROUND OF THE INVENTION

Generally it is possible that by means of a stripping tool successively the single conductors of the cable are stripped. However, this is elaborate and requires high diligence if the stripping lengths have to be the same for all of the conductors.

DE 689 23 071 T2 (corresponding to EP 0 375 458 B1) discloses a machine into which a cable with three conductors is inserted with the outer insulation removed in the end region. The three conductors are arranged parallel to each other in one plane and fixed by a fixing device which is pneumatically actuated. The insulations of the conductors is cut between two pneumatically actuated stripping blades. For this purpose the stripping blades each comprise three cutting edge halves arranged one besides another. After the pneumatically driven stripping of the ends of the insulations of the conductors then in the machine the stripped ends of the wires of the conductors are crimped also in a pneumatically driven way two work pieces formed by sleeves for providing electrical ports.

DE 10 2008 058 168 A1 discloses a stripping machine for stripping the conductors of a cable comprising four conductors. Two stripping blades which slide along each other in parallel planes over the working stroke and move towards each other each comprise W-shaped front contours. The W-shaped front contours have an orientation opposite to each other. The W-shaped front contours each form two V-shaped cutting edge halves being arranged one besides another. Pairs of V-shaped cutting edge halves of the two W-shaped front contours together form two diamond-shaped cutting edges. Over the working stroke the cross section of the diamond shape reduces which leads to a cutting into an insulation of a conductor arranged in the cutting edge. For the stripping of a cable comprising four conductors in the beginning two conductors are inserted into the adjacent diamond-shaped cutting edges. Then the cutting into the insulations of the two conductors can be induced and then the stripping of these conductors can be performed. Subsequently then the other two conductors are inserted into the same cutting edge so that also these conductors can be stripped. DE 10 2008 058 168 A1 discloses also the crimping of the stripped conductors to plugs by a machine.

DE 30 15 606 A1 (corresponding to GB 2 063 580 A) discloses a stripping tool for stripping a cable having one single conductor or having multiple conductors. For this purpose the stripping tool comprises four stripping blades being evenly distributed over the circumference. Each of the stripping blades comprises a continuous, bow-shaped cutting edge quarter. The stripping blades form two pairs of stripping blades which are arranged under an offset of 90° relative to each other and which are moveable into planes arranged directly adjacent from each other. When actuating the stripping tool all of the four stripping blades are continuously moved towards a longitudinal axis of a cable arranged between the stripping blades. In this way an insulation of the cable is to the same extend cut from four sides. In the case of a cable having multiple conductors only a common insulation of all of the conductors is cut whereas it is to be avoided that an additional insulation of the single conductors is damaged by the stripping blades.

CN 101 431 223 A discloses a stripping tool for stripping single conductors of a cable having three conductors. In the cable the conductors are arranged one besides another similar to a wide-band cable. For this purpose the stripping tool comprises two pairs of stripping blades being arranged remote from each other. The first pair of stripping blades has a design such that the pair of stripping blades is able to cut into the insulation of the two outer conductors whereas the conductor arranged in the middle can be passed without damages between the two stripping blades. The second pair of stripping blades which comprises the same closing direction as the first pair of stripping blades comprises only one cutting edge on both stripping blades which cuts into the insulation of the conductor arranged in the middle. Due to the fact that the insulations of the conductors are cut by pairs of stripping blades arranged remote from each other the transition from the insulated part of the conductor to the stripped part of the conductor for the conductor arranged in the middle is arranged with an offset to the transition of the insulated part to the stripped part of the two conductors arranged on the outside which is not desired for a lot of connections.

DE 28 48 445 A1 (corresponding to U.S. Pat. No. 4,327, 609 A) discloses a stripping machine driven by a motor and used for stripping a cable. The stripping machine comprises four stripping blades evenly distributed over the circumference forming two pairs arranged under an offset in circumferential direction of 90°. The stripping blades each comprise straight cutting edge parts having an inclined orientation. When actuating the stripping tool the stripping blades move (similar to a photographic aperture diaphragm) towards each other so that the cutting edge parts in a part of the circumference which is smaller than one quarter of the entire circumference cut continuously in an insulation of a cable passed between the cutting edge parts. By the particular diaphragm-shaped design it is intended to provide an even cutting behavior for cables of different thicknesses. Also here only the outer insulation of the cable is cut whereas individual insulations of conductors of a cable having multiple conductors are not cut.

Also DE 39 28 196 A1 (corresponding to U.S. Pat. No. 4,873,901 A) discloses a complex stripping machine having a plurality of pairs of stripping blades for stripping a cable. Here, for the stripping of a particular cable only one pair of stripping blades is used. Each of the stripping blades comprises an approximately V-shaped cutting edge part. Accordingly, by the two associated stripping blades with the movement of the two cutting edge parts towards each other the cable is cut almost completely in circumferential direction. The different pairs of stripping blades which can be arranged with an offset relative to each other have cutting edge parts having different shapes so that it is possible to strip in an alternative way cables having different thicknesses by the stripping tool. Also here again only the outer insulation of the cable is cut whereas individual insulations of conductors of a cable having multiple conductors are not allowed to be cut.

SUMMARY OF THE INVENTION

With the novel stripping tool, it is possible to provide an alternative or improved stripping tool by which it is possible to simultaneously strip a plurality of conductors of a multi-wired cable. Furthermore, it is an object of the invention to propose a new method for stripping a multi-wired cable.

One inventive embodiment bases in particular on the finding that a stripping tool by which three or more conductors of a cable are stripped by two stripping blades moved relatively to each other the cutting edge halves have to be arranged one besides the other at the stripping blades. This leads to the consequence that for cutting into the insulation of the conductors it is required to arrange the conductors one besides another, preferably in one plane. This again leads to the consequence that the cutting into the insulation of conductors for the conductors arranged further on the outside is provided at a longitudinal extension of the conductor differing from the longitudinal extension of the cutting into the insulation of a conductor arranged not on the outside, in particular a conductor arranged in the middle. However, generally it is of interest to cut into the insulations at the same longitudinal extensions of all of the conductors which leads to the desired same lengths of the stripping. It is also possible that for the arrangement of plurality of conductors one besides the other in this way it is required that the conductors have to be spread apart in the exit region of the conductors from the outer insulation which requires large plastic deformations of the wires in the conductors. Furthermore it is possible that for an arrangement of a plurality of conductors one besides another in this way the outer insulation has to be removed over a comparatively long longitudinal extension. Accordingly, then also the sections of the conductors no longer being protected by the outer insulation comprise an undesired large longitudinal extension.

One embodiment of the invention proposes not to use only one pair of stripping blades for stripping the multi-wired cable. Instead, for one embodiment the stripping tool comprises a first pair of stripping blades, namely a first stripping blade and a second stripping blade. Over a working stroke of the stripping tool for cutting into an insulation the stripping blades of the first pair are moved in a first plane relative to each other into a first closing direction. Furthermore, the stripping tool comprises a second pair of stripping blades, namely a third stripping blade and a fourth stripping blade. The stripping blades of the second pair are also moved over the working stroke of the stripping tool for cutting into an insulation in a second plane relative to each other in a second closing direction. Here, the cutting blades of the two pairs each form (at least) four cutting edge halves for different conductors of the cable. These (at least) two cutting edge halves join to (at least) four cutting edges. In order to avoid collisions of the two pairs of stripping blades over the working stroke the planes wherein the two pairs of stripping blades move differ from each other with respect to their positions and/or orientation. Preferably, the planes have a parallel orientation. On the other hand according to one embodiment of the invention the first closing direction differs from the second closing direction.

In the following, an embodiment of the inventive design is explained for the stripping of a cable comprising four conductors (without a limitation to this embodiment being intended): In the two pairs of stripping blades the front contours of the stripping blades each form two cutting edge halves being arranged one besides another. In the closed position the associated cutting edge halves of the pairs of stripping blades together form a cutting edge which is partially, almost completely or completely closed in circumferential direction. The cutting edge cuts into the insulation of the conductor arranged therein. Accordingly, each pair of stripping blades can be used for cutting into two conductors of the cable having the four conductors. The cutting is performed in different (preferably parallel) planes by the two pairs of stripping blades. The conductors which are not to be cut by one pair of stripping blades are passed besides this pair of stripping blades or passed through the same. Accordingly, according to an embodiment of the invention (e.g. differing from the embodiment known from DE 10 2008 058 168 A1) it is possible not to successively strip two conductors of a cable with four conductors each in two subsequent working steps. Instead, all of the conductors can be stripped simultaneously.

In the following the assumption is made that the planes have a parallel orientation without this necessarily being the case. Within the framework of the invention the distance of the two planes wherein the cutting edge halves of the pairs of stripping blades are moved and guided is arbitrarily. It is also possible that the stripping blades are not planar but comprise a curved or complex geometry. Here, the distance of the parallel planes might correlate to the difference of the longitudinal extensions at which the cutting edge halves cut into the insulations of the conductors. In order to mention only some non-limiting examples the two planes might have a distance which is smaller than 10 mm, 5 mm, 1 mm, 0.5 mm, 0.2 mm or even 0.1 mm.

For a particular proposal of the invention the first plane and the second plane are arranged directly adjacent to each other. Here, the stripping blades of the pairs or the associated cutting edge halves of the pairs of the stripping blades can be passed directly adjacent to each other beside one another or might slide along each other. It is also possible that in the neighborhood of the cutting edge halves the stripping blades have an offset or a cranking towards each other such that a minimal distance of the cutting edge halves of the different pairs of the stripping blades results. Furthermore it is possible that the planes have a minimal distance from each other if the stripping blades of the two pairs form cutting edge halves which have a chamfer only on one side with the provision of the one-sided chamfer on the side of the cutting edge half which faces away from the stripping blades of the other pair. By use of the inventive arrangement of the first plane and the second plane directly adjacent to each other it is possible to strip the conductors with the same or nearly the same stripping length despite of the use of two pairs of stripping blades.

It is generally possible that the conductors of the cable which are not processed by a first pair of stripping blades but by the other second pair of the stripping blades is passed laterally besides the first pair of the stripping blades. For a particular proposal of the invention at least one stripping blade comprises a recess having an open edge. In this case it is possible that a conductor which is not processed by the stripping blades of this pair passes through the recess having the open edge. Then, this conductor can be processed by the other pair of stripping blades. Preferably, over the entire working stroke of the stripping tool the at least one cutting edge formed by one pair is arranged behind the recess of the stripping blades having a closed edge of the other pair.

For the actuation of the stripping blades there are a lot of options. Generally all of the drive mechanisms known from the prior art for stripping tools (in particular stripping pliers) can be used for generating a driving movement. For one proposal of the invention the stripping tool comprises an actuation element. This actuation element is moved over the working stroke of the stripping tool (by any drive mechanism). Furthermore, the stripping blades comprise counter actuation surfaces which contact actuation surfaces of the actuation element. By the contact between the actuation surfaces and the counter actuation surfaces then the driving forces and driving movements are transmitted to the stripping blades. For this purpose by means of the drive mechanism the actuation element is moved relative to a tool head over the working stroke in an actuation direction. The actuation element forms actuation surfaces which are inclined relative to the actuation direction. Accordingly, the inclination of the actuation surfaces defines to which extent the actuation of the actuation element in the actuation direction leads to a displacement of the counter actuation surface and so leads to the movement of the associated stripping blade. By the inclination of the actuation surface also a transmission ratio of the driving force of the actuation element to a driving force of the stripping blade can be provided. Here, the actuation surface might comprise a constant inclination. It is also possible that the actuation surface is curved so that the actuation surface comprises a changing inclination with also a resulting changing transmission characteristic between the actuation element and the stripping blade.

For the design and the at least one degree of freedom of the actuation element there are a lot of options. For one proposal of the invention the actuation element is an actuation ring. In this case the actuation direction might be a circumferential direction of the actuation ring into which the actuation surfaces of the actuation ring are rotated over the working stroke. In this case the actuation surfaces are inclined relatively to the circumferential direction. Here, the actuation surfaces might be inner surfaces of the actuation ring. So, the inner surfaces of the actuation ring have not the shape of a segment of a cylinder corresponding to a constant inner radius of the actuation ring. Instead, the inner surfaces of the actuation ring are curved or inclined relative to a the shape of a segment of a cylinder. By use of an actuation ring in some cases it is in a very simple fashion possible to simultaneously and in a synchronized way actuate a plurality of stripping blades. In this case the stripping blades can be located on the radial inner side of the actuation ring and can be evenly distributed in circumferential direction.

For another proposal of the invention the actuation element comprises (at least) one actuation wedge. In this case the actuation direction of the actuation element might be a (in particular translational) displacement direction of the actuation wedge. A wedge surface of the actuation wedge which then forms the actuation surface is in this case inclined relative to the displacement direction. It is generally possible that an actuation element comprises two or more wedges of this type or actuation wedges form a kind of prism. Accordingly, the actuation element might e.g. form two actuation wedges with V-shaped diverging wedge surfaces. Then, further actuation wedges are fixed at the pliers head. Wedge surfaces of the actuation wedges are opened in the shape of a V towards the opening of the V of the actuation surfaces of the actuation element. The two V-shaped wedge surfaces form a kind of parallelogram. With the movement of the actuation element in the displacement direction the distance of opposing sides of the cross section of the parallelogram reduces. Accordingly, actuation surfaces formed by the sides and so by the wedge surfaces move in inner direction and an actuation of the stripping blades by the counter actuation surfaces in inner direction can be induced with a coinciding cutting into the respective insulations.

It is generally possible that the conductors of the cable are freely introduced into the stripping tool. For another proposal of the invention accommodations for all (at least two, preferably four) conductors of the cable are provided at the stripping tool. An accommodation of this type might comprise an insertion chamfer used for bringing the conductors into the correct orientation and/or position. Furthermore, the accommodation might at least partially fix the conductor in the tool head of the stripping tool which might be provided under an establishment of a small play, with a certain friction or with an additional manually actuated fixing device. Preferably, the accommodations are exactly positioned relative to the cutting edges of the two pairs of the stripping blades of the stripping tool and arranged in front of and/or behind the same. In the case that the cutting edges are (evenly or unregularly) distributed along the circumference of a circle also the accommodations can be arranged correspondingly.

It is possible that the pushing of the conductors of the cable into the accommodations is provided in a free and unlimited way so that the user is able to define the achieved stripping length when pushing the conductors of the cable into the accommodations. However, according to one embodiment of the invention it is possible that the accommodations comprise stops for defining the insertion depth of the conductors and so for defining the stripping length. Here, the stops can fixedly define the insertion depth of the conductors. However, it is also possible that the insertion depth of the conductors can be adapted by an adjustment of the stops (in steps or in a stepless fashion). Here, the stops for the single conductors can be formed by single stop bodies or one common stop body.

When successively to the running through the working stroke the cable with the stripped conductors is pulled out of the stripping tool, in the beginning the severed ends of the insulation of the conductors (which are retained by the stripping blades being in their closing position) remain in the tool head. It is possible that the ends of the insulation are e.g. manually removed from the tool head and the accommodations or that the tool head is rotated in such a way that the ends of the insulation due to their own weight (in some cases supported by knocking or shaking) fall out of the tool head and the accommodations.

For one inventive stripping tool the stripping tool comprises an ejector. By the ejector at least one end of an insulation of a conductor severed by the stripping tool over the working stroke can be ejected from the stripping tool and the accommodation. Preferably, by the ejector all of the severed ends of the insulations of the conductors are simultaneously ejected.

It is generally possible that a stripping tool comprises on the one hand stops for defining the insertion depth of the conductors and on the other hand comprises an ejector formed separately from these stops. For a very compact embodiment of a stripping tool the ejector for ejecting at least one end of an insulation of a conductor severed by the stripping tool over the working stroke moves the stop which is used for defining the insertion depth of the conductors. Accordingly, here the stop is used in a multifunctional way because the stop both defines the insertion depth and is used for pushing out the severed ends of the insulation.

A stripping blade usable within the framework of the invention comprises two cutting edge halves. By the two cutting edge halves it is possible to simultaneously cut into insulations of two conductors of a cable. Between the two cutting edge halves the stripping blade comprises a recess having an open edge which is e.g. U-shaped in a longitudinal section. A conductor of the cable which is not processed (and which is in particular not cut) by this stripping blade is able to pass through this recess having an open edge. The conductor of the cable can then be processed in a parallel plane by a stripping blade of another pair of stripping blades. Preferably, the two cutting edge halves as well as the recess with the open edge located there between are formed by a front contour of the stripping blade. Here, it is possible that the opening of the recess with the open edge and the openings of the two cutting edge halves are arranged in one plane of the front contour. Furthermore it is possible that the recess comprising the open edge extends deeper into the stripping blade than the two cutting edge halves.

For the further design of the stripping blade there are a lot of options. For one proposal of the invention the stripping blade comprises a counter actuation surface by which the stripping blade interacts with an actuation surface of an actuation element of the stripping tool. By the actuation surface the stripping blade can be moved during the working stroke and can be biased by a force for cutting into the insulation. Alternatively or cumulatively it is possible that the stripping blade comprises a supporting surface at which a spring base of a return spring is supported. Here, the return spring might serve for moving the stripping blade back away from the conductor of the cable after having run through the working stroke.

By use of the inventive stripping tool it is possible to perform a method for stripping a cable which comprises at least four conductors each comprising an insulation. In a method of this type at first at least four conductors are inserted into at least one accommodation of a stripping tool (preferably one accommodation for each conductor). Subsequently, the working stroke of the stripping tool is run through. During the working stroke there is a movement of a first pair of stripping blades. During this movement the first pair of stripping blades cuts into insulations of two first conductors of the cable. Simultaneously, there is a relative movement of a second pair of stripping blades over the working stroke of the stripping tool with the cutting of the second pair of stripping blades into insulations of two other second conductors of the cable. Here, the two pairs of stripping blades are moved over the working stroke in parallel planes.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a stripping blade or cutting edge half is mentioned, this is to be understood such that there is exactly one stripping blade or cutting edge half or there are two stripping blades or cutting edge halves or more stripping blades or cutting edge halves. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
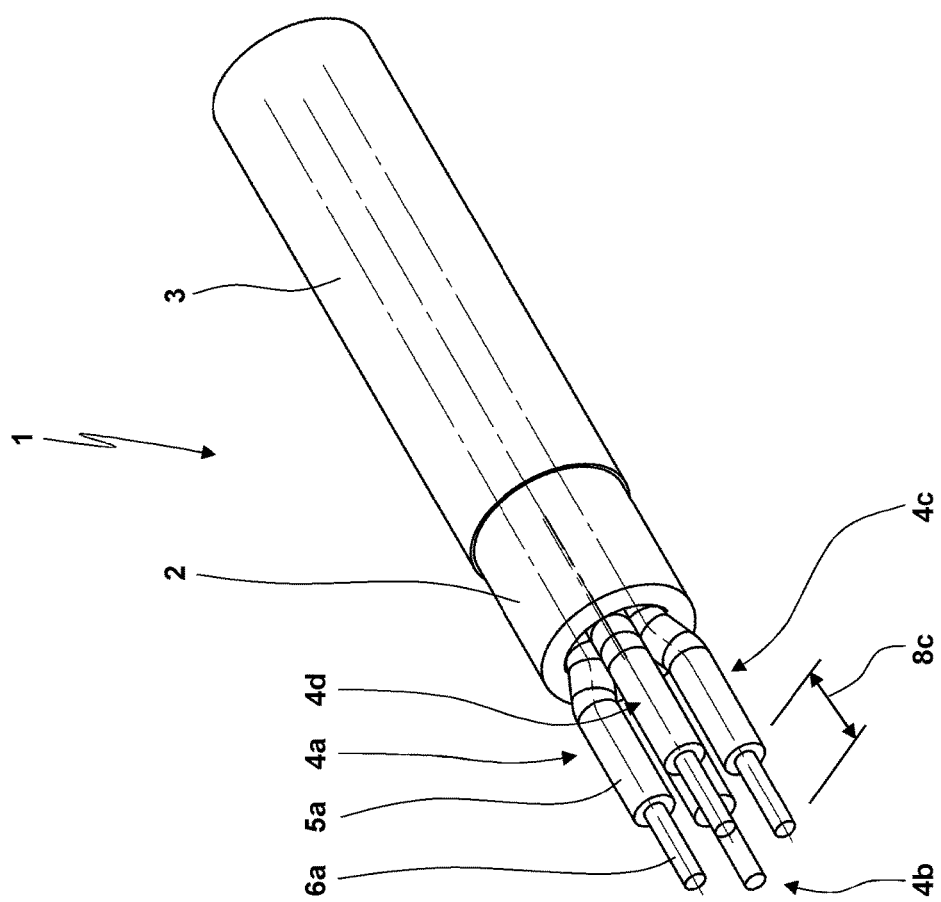
FIG. 1 in a three-dimensional view shows a cable with four conductors with removed end of an outer insulation and conductors being stripped in their ends with an inventive stripping tool.

If in the following identical components or components being similar with respect to the geometry and/or function are present, in the following partially the same reference numerals are used for these components. In this case the single components are labeled with additional letters a, b, c .... In this case it is also possible that reference is made to single components, a part of the components or all of the components by using the reference numeral without additional letter. When describing the further design of components which are marked with the same reference numerals in the drawings and in the specification partially only reference is made to one of these components which might then be labeled with or without the additional letter.

FIG. 1 shows a cable 1 having multiple conductors. Here the cable 1 is a round or circular cable. The cable 1 comprises an outer insulation 2 with a protective sheet 3. In the outer insulation 2 four conductors 4a, 4b, 4c, 4d of the cable 1 having multiple conductors are accommodated. The conductors 4 each comprise an insulation 5 which surrounds or covers a wire 6 which might be a single wire or which might be formed by a plurality of strands. By removing an end of the outer insulation 2 the ends of the conductors 4 are freed. By processing the conductors 4 with an inventive stripping tool 7 the wires 6 of the conductors are freed over a stripping length 8. For the processing by the stripping tool 7 and/or for the connection of the conductors 4 to an electrical component or a plug it is possible that the conductors 4 are to a small extent spread apart (as shown in the exit region from the outer insulation 2 of the cable 1). However, here the stripped end regions of the conductor 4 are again arranged with a parallel orientation relative to each other.

Figure 2:
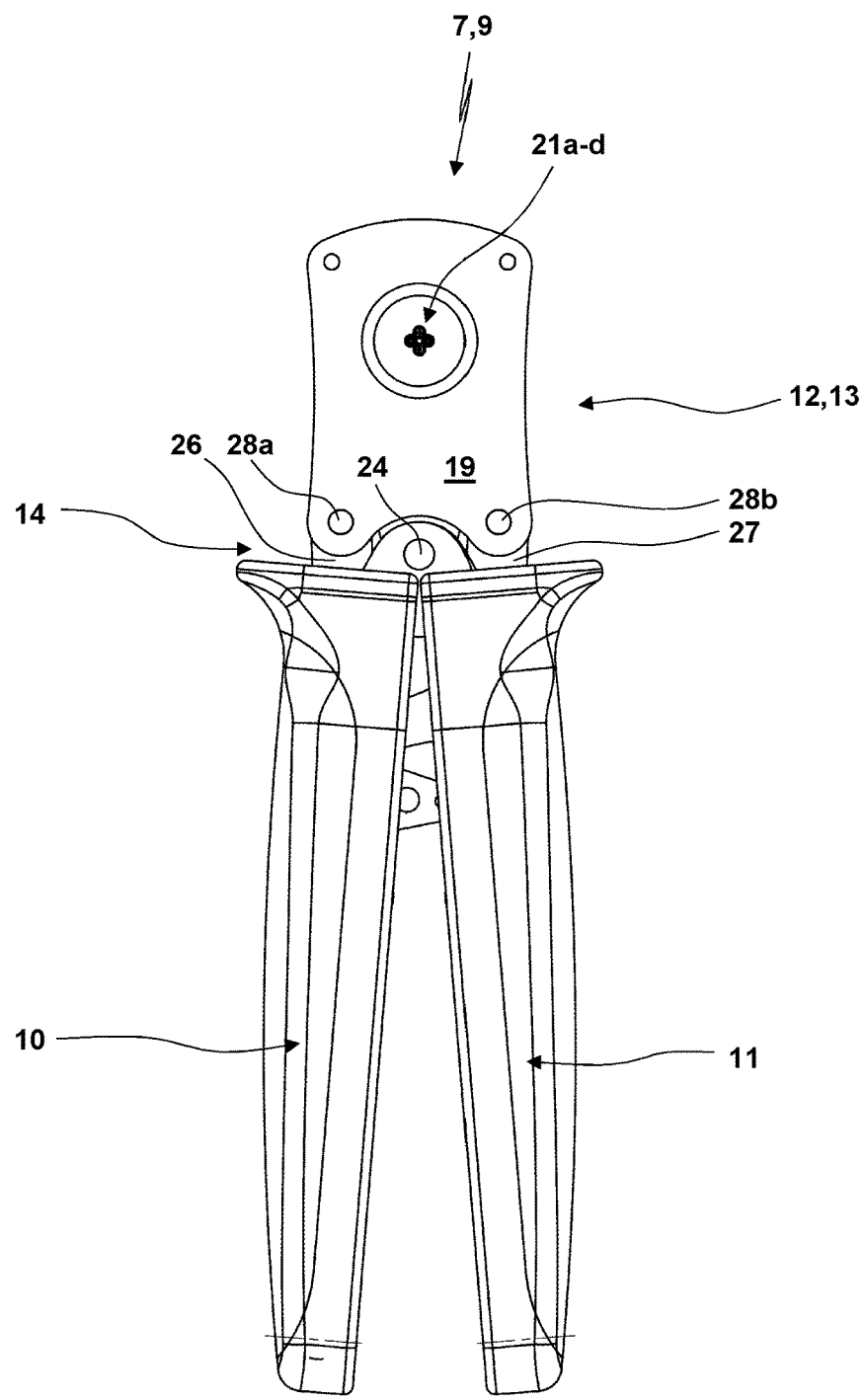
FIG. 2 shows a stripping tool embodied as stripping pliers in a front view.
Figure 3:
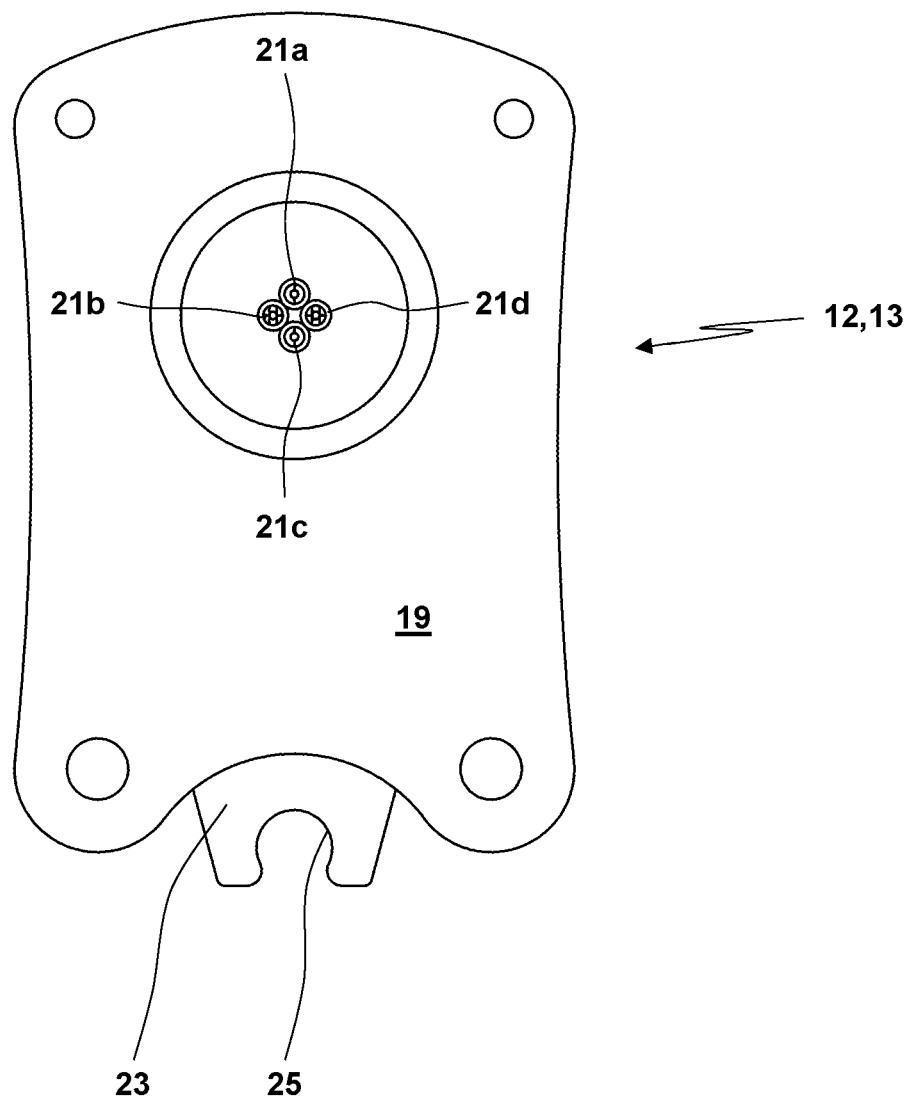
FIG. 3 shows a pliers head of stripping pliers according to FIG. 2 in a front view.

FIG. 2 shows a stripping tool 7 embodied as stripping pliers 9. The stripping pliers 9 comprise two hand levers 10, 11 which can be operated manually by the user and a tool head 13 embodied as pliers head 12. The hand levers 10, 11 are coupled by a drive mechanism 14 to the stripping blades 15, 16, 17, 18 (here also denoted as first stripping blade 15, second stripping blade 16, third stripping blade 17 and fourth stripping blade 18) such that the actuation of the hand levers 10, 11 with a pivoting movement of the same relative to each other and towards each other results in a common movement of the stripping blades 15, 16, 17, 18 from an open position into a closed position. The pliers head 12 comprises cover plates 19, 20. The cover plates 19, 20 each form accommodations 21, 22 for accommodating the conductors 4 of the cable 1 (cp. also the representation of the pliers head 12 according to FIG. 3). Preferably, the accommodations 21, 22 are each formed by bores. The diameter of the bores is slightly larger than the diameter of the conductors 4. On the input side the bores forming the accommodations 21, 22 might comprise an insertion chamfer.

For the drive mechanism 14 which is to be used in the stripping pliers 9 any drive mechanism known from the prior art can be used. It is e.g. possible that a drive mechanism is used wherein one hand lever 11 is fixedly connected to the pliers head whereas the other hand lever 10 is supported for being pivoted or a drive mechanism is used wherein both hand levers 10, 11 are pivoted relatively to the pliers head 12. For the embodiment chosen here a drive mechanism 14 is used wherein by the drive mechanism 14 a plunger 23 is moved with a translational movement over the working stroke in a longitudinal direction of the stripping pliers 9. Suitable drive mechanisms 14 for the movement of the plunger 23 over the working stroke due to the actuation of the hand levers 10, 11 are in particular known from the publications DE 40 23 337 C1 (corresponding to U.S. Pat. No. 5,153,984 A), DE 44 27 553 C2, DE 198 32 884 C1 (corresponding to U.S. Pat. No. 6,155,095 A), DE 100 56 900 C1 (corresponding to U.S. Pat. No. 6,612,147 B2), DE 101 32 413 C2 (corresponding to U.S. Pat. No. 6,877,228 B2), DE 101 40 270 B4 and DE 10 2007 038 626 B3 (corresponding to U.S. Pat. No. 8,296,956 B2) which are incorporated by reference into the present patent application with respect to the drive mechanism 14 for driving a plunger 23 by the operation of the hand levers 11, 12. In particular these drive mechanisms 14 base upon the design that in their end regions the hand levers 10, 11 are connected to each other for being pivoted by a pressure bolt 24. The pressure bolt 24 is supported in an accommodation 25 of the plunger 23. On both sides of the coupling of the pressure bolt 24 to the plunger 23 pulling shackles 26, 27 extend. The pulling shackles 26, 27 are each in one end region connected by bolts 28a, 28b for being pivoted to the pliers head 12 and in the other end region at a location remote from the pressure bolt 24 linked for being pivoted to the hand levers 10, 11.

Figure 4:
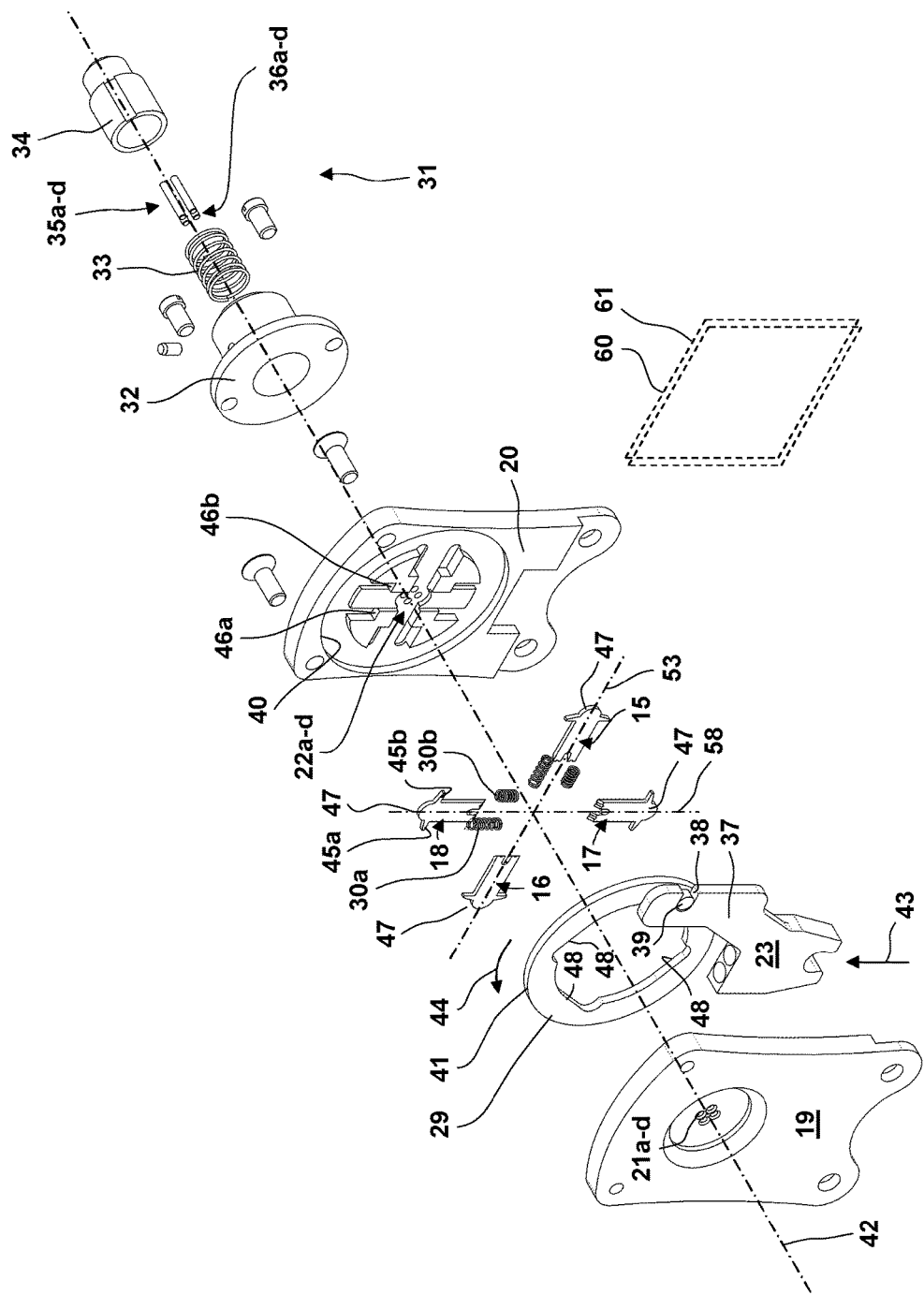
FIG. 4 shows the pliers head of FIG. 3 in a three-dimensional exploded view.
Figure 5:
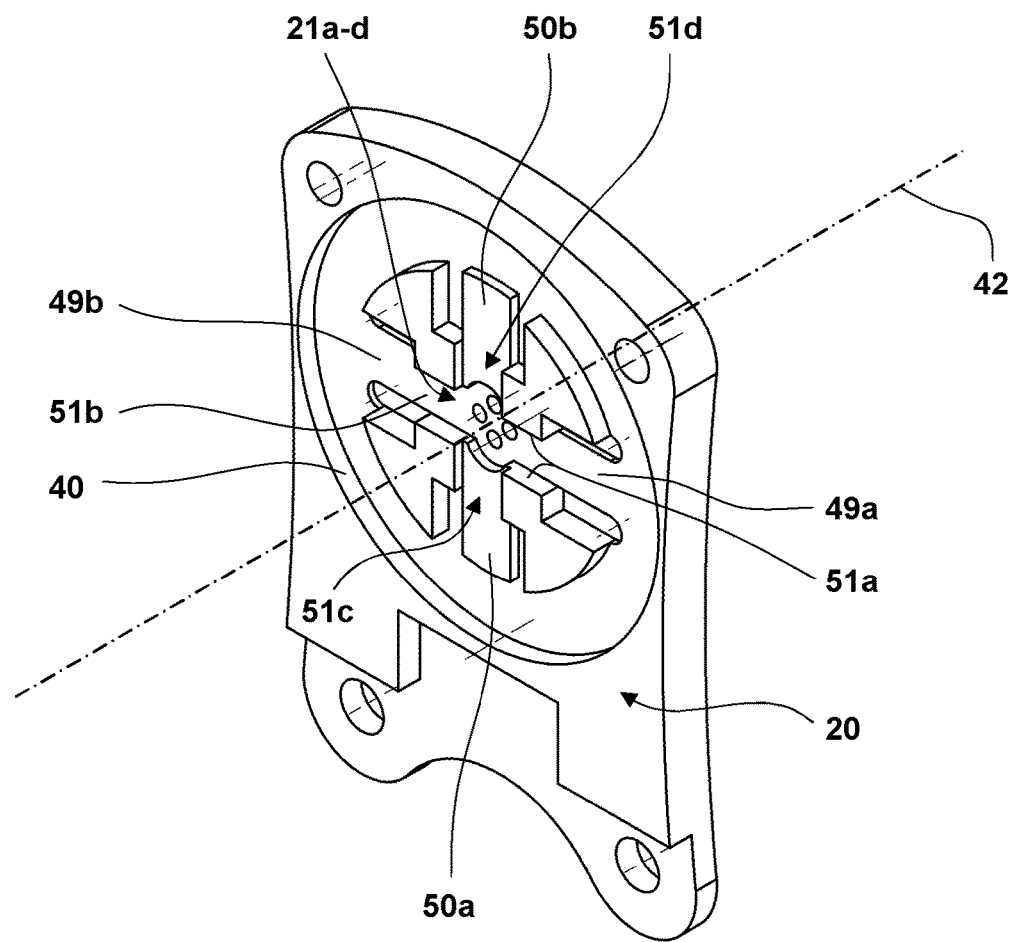
FIG. 5 in a three-dimensional view shows a cover plate of a pliers head of FIGS. 3 and 4 with guiding surfaces for the pairs of stripping blades formed thereat and the actuation ring.

FIG. 4 shows an exploded view of the pliers head 12 of the stripping pliers 9. The pliers head 12 comprises the plunger 23, an actuation ring 29 and the stripping blades 15, 16, 17, 18 with associated return springs 30 arranged between the cover plates 19, 20. An ejector 31 is fixed at the outer side of the cover plates 20.

The ejector 31 comprises a housing 32. In the housing 32 an actuation button 34 is displaceable to a limited extend in axial direction under the bias of a pressure spring 33. At a location within the housing 32 the actuation button 34 comprises a blind bore. At the blind bore or at the bottom of the blind bore four pins 35a-35d are supported (cp. also FIG. 13). The pins 35a-d are arranged coaxially to the accommodations 32a-d. The diameter of the pins 35a-d form a clearance fit with the accommodations 22a-d. With the actuation of the actuation button 34 the pins 35a-d are pushed through the accommodations 22a-d. With this pushing movement it is possible to eject the ends of the insulations 5a-d of the conductors 4a-d which have remained in the accommodations 22a-d after the stripping process. Due to the fact that for the non-actuated actuation button 24 the pins 35a-d are arranged behind the accommodations 22a-d, the front faces of the pins 35a-d each form a stop 36a-36d. The stops 36a-d define how deep the conductors 4a-d can be passed through the accommodations 21, through the interior of the pliers head 12 and into the accommodations 22a-d so that in this way the stripping length 8 is defined.

The plunger 23 comprises a follower arm 37. A follower 39 (here a stud) of the actuation ring 29 engages with an accommodation 38 of the follower arm 37.

On the sides facing towards each other the cover plates 19, 20 comprise milled-out portions. The milled-out portions form a cylindrical guiding surface 40. By the cylindrical guiding surface 40 a cylindrical outer surface 41 of the actuation ring 29 is guided for a rotation about a rotational axis 42. Here, the rotational axis 24 has an orientation vertical to the pliers head plane which corresponds to the drawing plane of FIG. 3. Due to the engagement of the follower 39 of the actuation ring 29 with the accommodation 38 of the follower arm 37 a translational stroke 43 of the plunger 23 leads to a rotational movement of the actuation ring 29 about the rotational axis 42 so that the actuation ring 29 is moved in circumferential direction 44.

The stripping blades 15-18 are arranged in pairs 52, 57 in parallel planes 60, 61 which have an orientation transverse to the longitudinal axis 42. Here, the longitudinal axes of the stripping blades 15 to 18 are arranged similar to a cross in the two planes 60, 61. Over the working stroke of the stripping pliers 9 (so over the stroke 43 of the plunger and over the pivoting movement of the actuation ring 29 in circumferential direction 44) the stripping blades 15-18 are able to move simultaneously in inner direction along closing directions 53, 58 having an orientation vertical to each other towards the rotational axis 42 along the legs of the cross. This movement is performed while biasing the return springs 30. The outer spring base of the return springs 30 is supported at a supporting surface 45 of the stripping blades 15-18. For the shown embodiment the stripping blades 15-18 each form two transverse webs located on the radial outside of the rotational axis 42 and provided at the stripping blades 15-18. The transverse webs form supporting surfaces 45a, 45b for two return springs 30a, 30b associated with a stripping blade 15-18. The other spring base of the return springs 30a, 30b which is located on the radial inner end is supported at a suitable supporting surface 46 of at least one cover plate 19, 20.

On the radial outer side the stripping blades 15-18 comprise counter actuation surfaces 47a-d which here have a cambered or convex shape. The counter actuation surfaces 47 contact inner actuation surfaces 48a-d of the actuation ring 29. The actuation surfaces 48 are inclined relative to the circumferential direction 44 such that a rotation of the actuation ring 29 in circumferential direction 44 leads to a change of the distance of the contact point or contact surface of the counter actuation surfaces 47a-d of the stripping blades 15-18 with the actuation surfaces 48a-d from the rotational axis 42. In this way a radial movement of the stripping blades 15-18 can be induced. The actuation surfaces 48 of the actuation ring 29 are provided at the actuation ring 29 at positions evenly distributed in circumferential direction.

For the shown embodiment the stripping blades 15-18 have a plate-like design. The upper side and the lower side of the plate-like stripping blades 15-18 are guided by guiding surfaces 49a, 49b or 50a, 50b of the cover plates 19, 20 having an orientation transverse to the rotational axis 42 and being arranged cross-like and being trapped between these between the two cover plates 19, 20. Here, the guiding surfaces 49a, 49b for the stripping blades 15, 16 have an offset in the direction of the rotational axis 42 relative to the guiding surfaces 50a, 50b for the stripping blades 17, 18, the offset at least corresponding to the plate thickness of the stripping blades 15, 16. In a corresponding way but in opposite directions this offset is also present at the two cover plates 19, 20 so that the guiding surfaces 50a, 50b have an offset to the front relative to the guiding surfaces 49a, 49b of the cover plate 20 towards the other cover plate 19 whereas in the cover plate 19 the corresponding guiding surfaces 50a, 50b have an offset to the back relative to the guiding surfaces 49a, 49b towards the cover plate 20.

Furthermore, the cover plates 19, 20 comprise four cross-like oriented and radially oriented guiding grooves 51. In the guiding grooves 51 the stripping blades 15-18 are laterally guided in closing direction 53 or in the closing direction 58. Due to the guidance of the stripping blades 15-18 on the one hand by the guiding surfaces 49, 50 and on the other hand by the guiding grooves 51 it is guaranteed that the stripping blades 15-18 only comprise a translational degree of freedom in a closing direction 53, 58 for a movement in radial direction vertically to each other over the working stroke of the crimping pliers 9.

Figure 6:
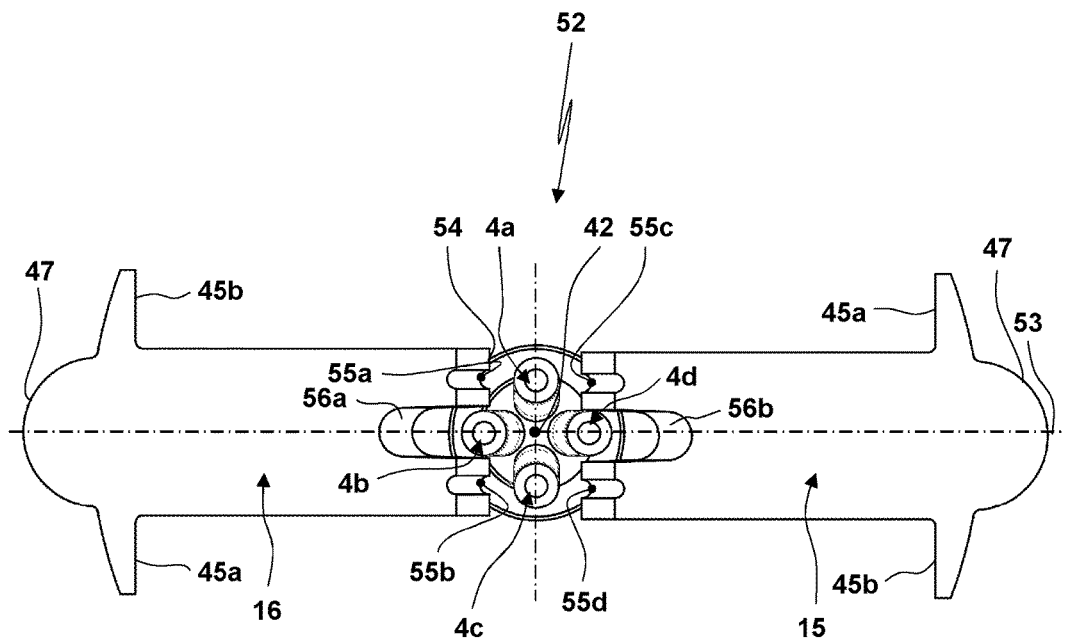
FIG. 6 shows a first pair of stripping blades in an open position.
Figure 7:
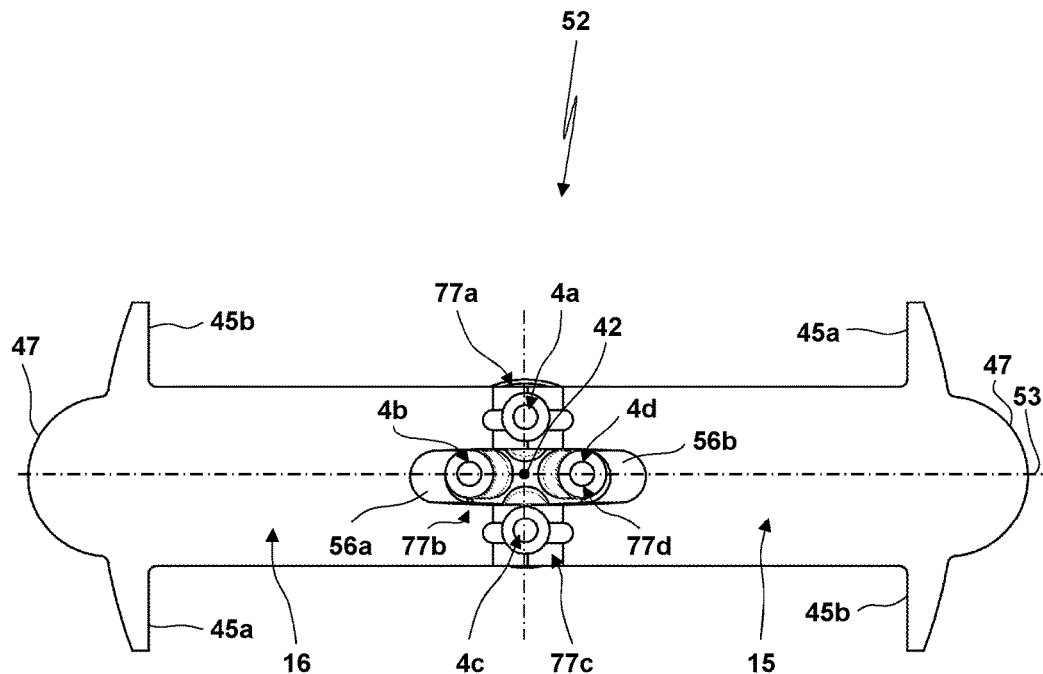
FIG. 7 shows the first pair of stripping blades of FIG. 6 in a closed position.

According to FIG. 6 the stripping blades 15, 16 form a first pair 52. For the first pair 52 of the stripping blades 15, 16 the guiding surfaces 49a, 49b and the guiding grooves 51a, 51b define the first closing direction 53 into which the stripping blades 15, 16 can be moved towards each other. Front contours 54 of the stripping blades 15, 16 facing towards each other on the one hand each form cutting edge halves 55a, 55b respectively 55c, 55d at one of the stripping blades 15, 16. In the middle between the cutting edge halves 55a, 55b respectively 55c, 55d the stripping blades 15, 16 each form a recess 56a, 56b having an open edge, here an U-shaped through recess. Due to the guidance of the ends of the conductors 4a-d by the accommodations 21, 22 the ends of the conductors 4a-d extend parallel to each other in the region of the stripping blades 15-18. In the section of FIG. 6 transverse to the rotational axis 42 which here corresponds to the longitudinal axis of the cable 1 the conductors 4a-d are evenly distributed along the circumference of a circle. Here, the diameter of the circle corresponds to the distance of the cutting edge halves 55 of a stripping blade. The conductors 4a, 4c are here positioned in the middle between the opposing cutting edge halves 55a, 55c respectively 55b, 55d of the stripping blades 15, 16. The other conductors 4b, 4d which are not processed directly by the stripping blades 15, 16 are positioned on the circumference of the circle at positions which are aligned to the extension of the recesses 56a, 56b. Independent on the movement of the stripping blades 15, 16 due to the recesses 56a, 56b the conductors 4b, 4d do not interact with the stripping blades 15, 16.

Figure 8:
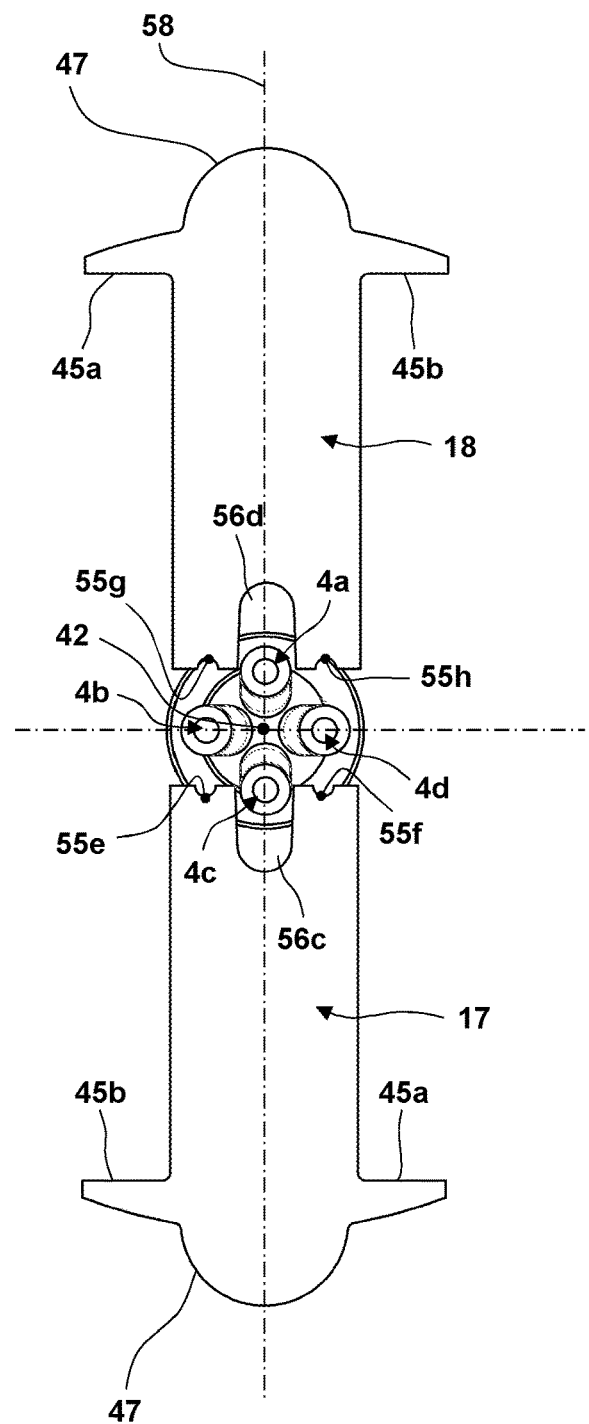
FIG. 8 shows a second pair of stripping blades in an open position.

Whereas in FIG. 6 the stripping blades 15, 16 are shown in the open position wherein the cutting edge halves 55a, 55c as well as 55b, 55d are positioned under a distance from the associated conductors 4a, 4c, FIG. 8 shows the closed position of the stripping blades 15, 16. In the closed position the conductors 4b, 4d are arranged in the recesses 56a, 56b. Instead, the cutting edge halves 55a, 55c as well as 55b, 55d have joined to cutting edges 77a, 77c being almost closed in circumferential direction and here being circular. The diameter of the cutting edges 77a, 77c corresponds to the diameter of the wire 6a, 6c of the conductors 4a, 4c. Accordingly, during the working stroke with the movement of the stripping blades 15, 16 in the closing direction 53 the cutting edge halves 55a, 55c as well 55b, 55d cut into the insulations 5a, 5c.

Figure 9:
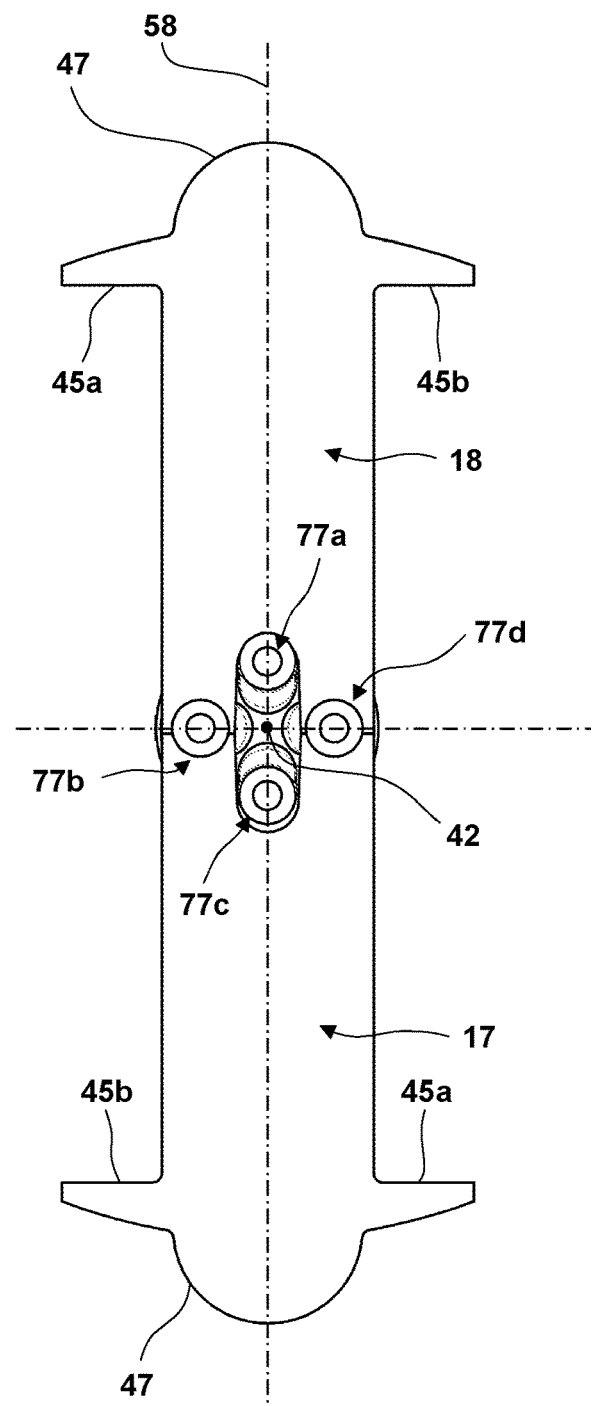
FIG. 9 shows the second pair of stripping blades of FIG. 8 in a closed position.

FIGS. 8 and 9 show a second pair 57 of stripping blades 17, 18 which generally have a design corresponding to the stripping blades 15, 16 and which are moved from the open position into the closed position during the working stroke. However, the longitudinal axes of the stripping blades 17, 18 are rotated by 90° relative to the longitudinal axes of the stripping blades 15, 16 so that also the closing direction 58 of the second pair 57 of the stripping blades 17, 18 is rotated by an angle of 90° relative to the first closing direction 53. This differing orientation has the consequence that the cutting edge halves 55e, 55g of the stripping blades 17, 18 interact with the conductor 4b whereas the cutting edge halves 55f, 55h of the stripping blades 17, 18 interact with the conductor 4d. Due to the recesses 56c, 56d of the stripping blades 17, 18 the stripping blades 17, 18 do not interact with the conductors 4a, 4c. In the closed position according to FIG. 9 the cutting edge halves 55e, 55g respectively 55f, 55h severe the insulations 5b, 5d of the conductors 4b, 4d.

Figure 10:
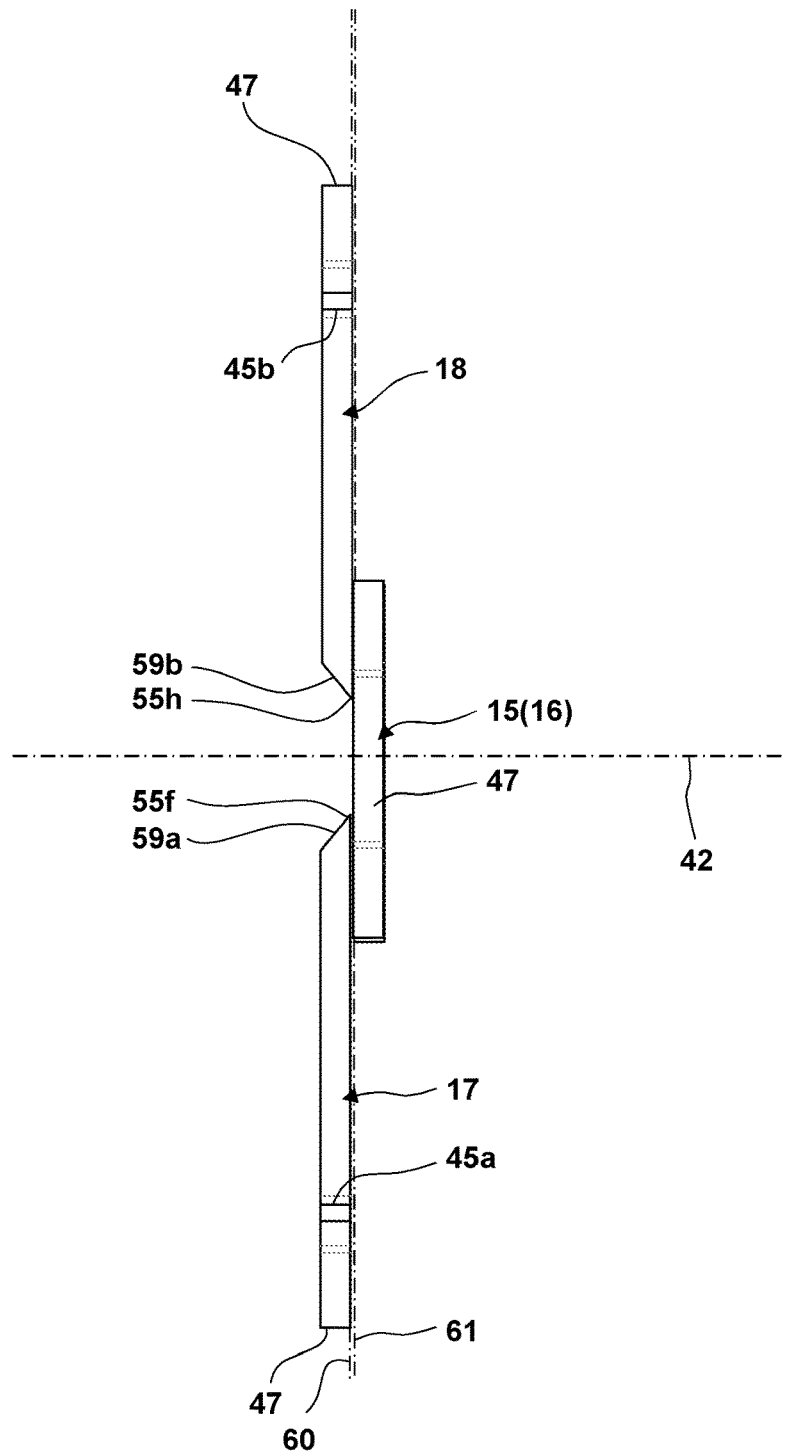
FIG. 10 shows the two pairs of stripping blades of FIGS. 6 and 8 in the open position for a viewing directing in actuation direction of the first pair of stripping blades.

The pairs 52, 57 of the plate-like stripping blades 15, 16 respectively 17, 18 are arranged in differing planes 60, 61 because (as explained before) the guiding surfaces 49a, 49b for the first pair 52 of the stripping blades 15, 16 have an offset relative to the guiding surfaces 50a, 50b for the second pair 57 of the stripping blades 17, 18 with an extent of the offset which at least equals the thickness of the plate of stripping blade 16-18. As can be seen in FIG. 10, the stripping blades 15, 16 of the first pair 52 and the stripping blades 17, 18 of the second pair 57 directly contact each other and slide along each other during the movement in the closing directions 53, 58. Furthermore, in FIG. 10 it can be seen that the cutting edge halves of the stripping blades 17, 18 only comprise a chamfer on one side. A chamfer 59a, 59b is only located on the side facing towards the stripping blades 15, 16. This leads to the consequence that the cutting edge halves 55f, 55h of the stripping blades 17, 18 are arranged in a second plane 60 which is arranged on the side of the stripping blades 17, 18 facing towards the first pair 52. Said in different words the cutting edge 55f, 55h are arranged directly adjacent to the stripping blades 15, 16 of the first pair 52. The corresponding applies for the other pair of cutting edges 55e, 55g of the stripping blades 17, 18. Also the stripping blades 15, 16 of the first pair 52 are only chamfered on one side. The chamfer is arranged on the side of the stripping blades 15, 16 facing away from the stripping blades 17, 18. Accordingly, the cutting edge halves 55a, 55c respectively 55b, 55d are arranged in a first plane 61 being located directly adjacent to the second plane 60. Accordingly, all of the cutting edge halves 55a, 55h cut into the insulations 5a-d of the conductors 4a-d approximately at the same longitudinal extensions of the conductors 4a-d.

The pairs of the cutting edge halves 55a, 55c (respectively 55b, 55d or 55e, 55g or 55f, 55h) of the pairs 52, 57 of the stripping blades 15, 16, 17, 18 together form cutting edges 77a, 77b, 77c, 77d. The cutting edges 77a, 77b, 77c, 77d are each arranged in one plane 60, 61 and all of them are arranged only in two directly neighboring planes 60, 61. During the working stroke the cutting edges 77 cut into the insulation 5 of the conductors 4. For the shown embodiment in the closed position the cutting edges 77 are almost (or completely with the exception of a gap which is due to tolerances) closed in circumferential direction. However, it is generally also possible that here also gaps remain between associated cutting edge halves so that the removal of the cut end of the insulation 5 to some extent requires a tearing off of the cut end region. The term "cutting edge half" does not necessarily mean that by the cutting edge half the stripping blade provides the half of the formed cutting edge. Instead, it is also possible that the associated cutting edges halves of a pair of stripping blades have differing cutting edge lengths and/or contours.

Figure 11:
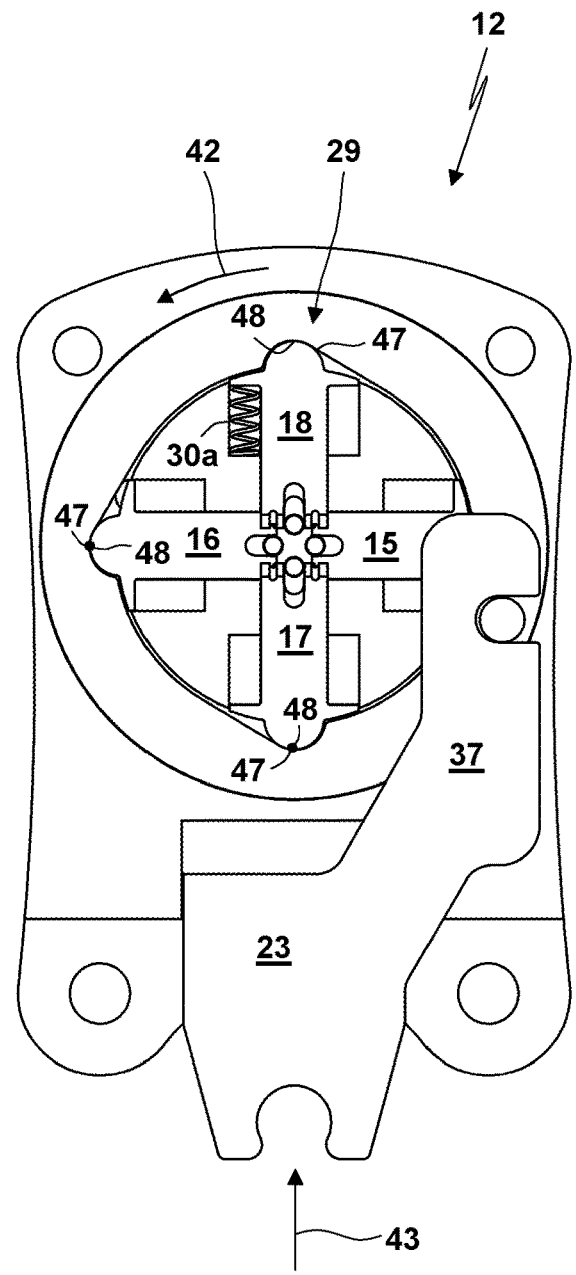
FIG. 11 shows in a front view a pliers head of FIGS. 3 to 5 with disassembled cover plate in an open position of the stripping blades.
Figure 12:
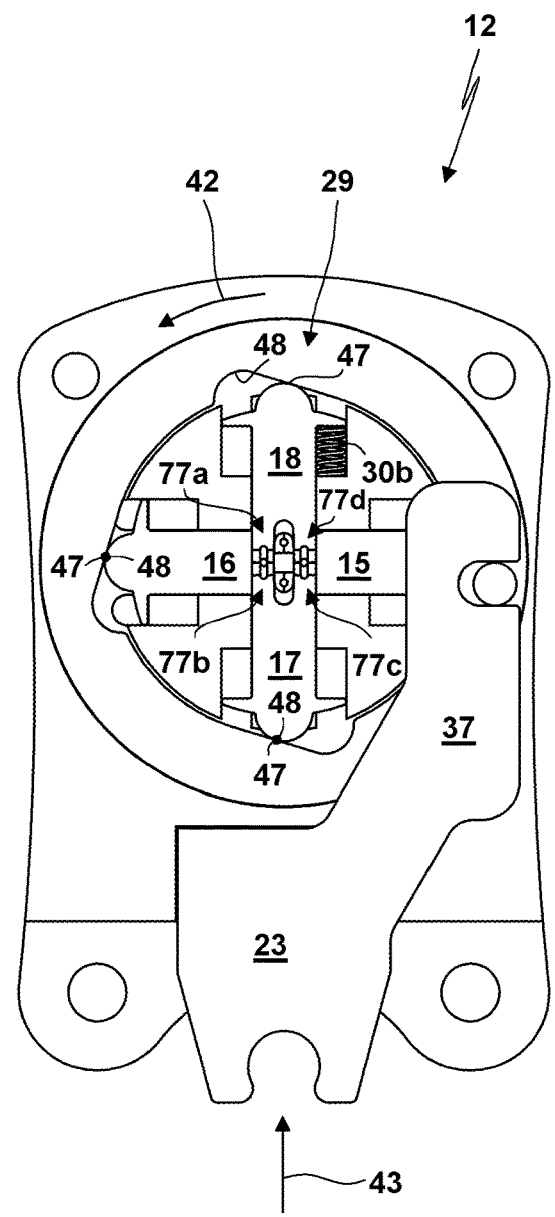
FIG. 12 shows the pliers head of FIGS. 3 to 5 in a representation corresponding to that of FIG. 11, however here with the stripping blades in a closed position.

FIGS. 11 and 12 show the pliers head 12 with disassembled cover plate 19. Here, FIG. 11 shows the pliers head in the open position, so prior to the running through the working stroke. Instead, FIG. 12 shows the pliers head 12 in the closed position, so after having run through the working stroke by the actuation of the hand levers 10, 11. Here, it is also to be seen that while running through the working stroke the stroke 43 of the plunger 23 leads to the result that the actuation ring 29 is rotated in circumferential direction 44 about the rotational axis 42. This movement of the actuation ring 29 leads to the consequence that the actuation surfaces 48 being inclined relative to the circumferential direction are moved relatively to the counter actuation surfaces 47 of the stripping blades 15-18 so that the counter actuation surfaces 47 slide along the actuation surfaces 48. The stripping blades 15, 16, 17, 18 are simultaneously displaced with a translational movement in inner direction in the movement directions 53, 58 towards the rotational axis 52. This displacement goes along with the approaching of the associated cutting edge halves 55 until the closed position is reached with the severing of the insulations 5 of the conductors 4. Here, the two pairs 52, 57 of the stripping blades 15-18 are guided for being passed one besides another. Here, to conductors 4a, 4c respectively 4b, 4d are cut by a pair 52 of stripping blades 15, 16 or a pair 57 of stripping blades 17, 18.

Figure 13:
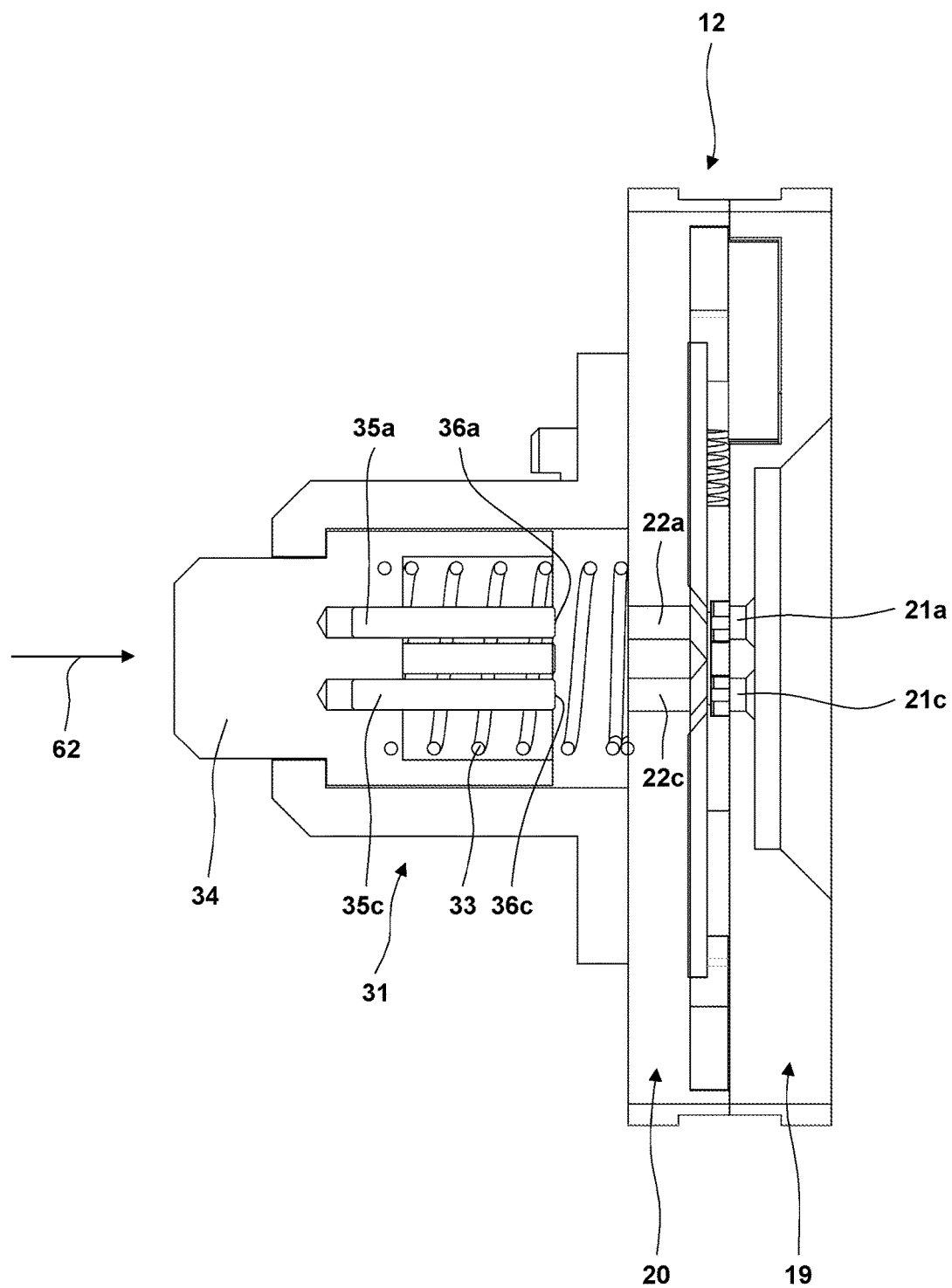
FIG. 13 shows the pliers head of FIGS. 3 to 5 and FIGS. 11 and 12 in a longitudinal section with an ejector for ejecting stripped ends of insulations of the conductors.

FIG. 13 shows a section through the ejector 31 which is mounted and fixed to the pliers head 12. FIG. 13 shows aligned accommodations 21a, 22a as well as 21c, 22c of the two cover plates 19, 20 and the pins 35a, 35c of the ejector 31 aligned to the accommodations. The pins 35a, 35c are in one end region held by the actuation button 34. If the conductors 4a, 4c are passed through the accommodations 21a, 22a respectively 21c, 22c, the conductors 4a, 4c contact the stops 36a, 36c formed by the front faces of the pins 35a, 35c. After the stripping the actuation of the actuation button 34 in an actuation direction 62 can be performed in order to eject the ends of the insulations 5a, 5c severed between the stripping blades 15-18 and the stops 36a, 36c. (The corresponding applies for accommodations 21b, 21d, 22b, 22d with the pins 35b, 35d and stops 36b, 36d being arranged under a rotation with an angle of 90° relative to the section in FIG. 13).

Figure 14:
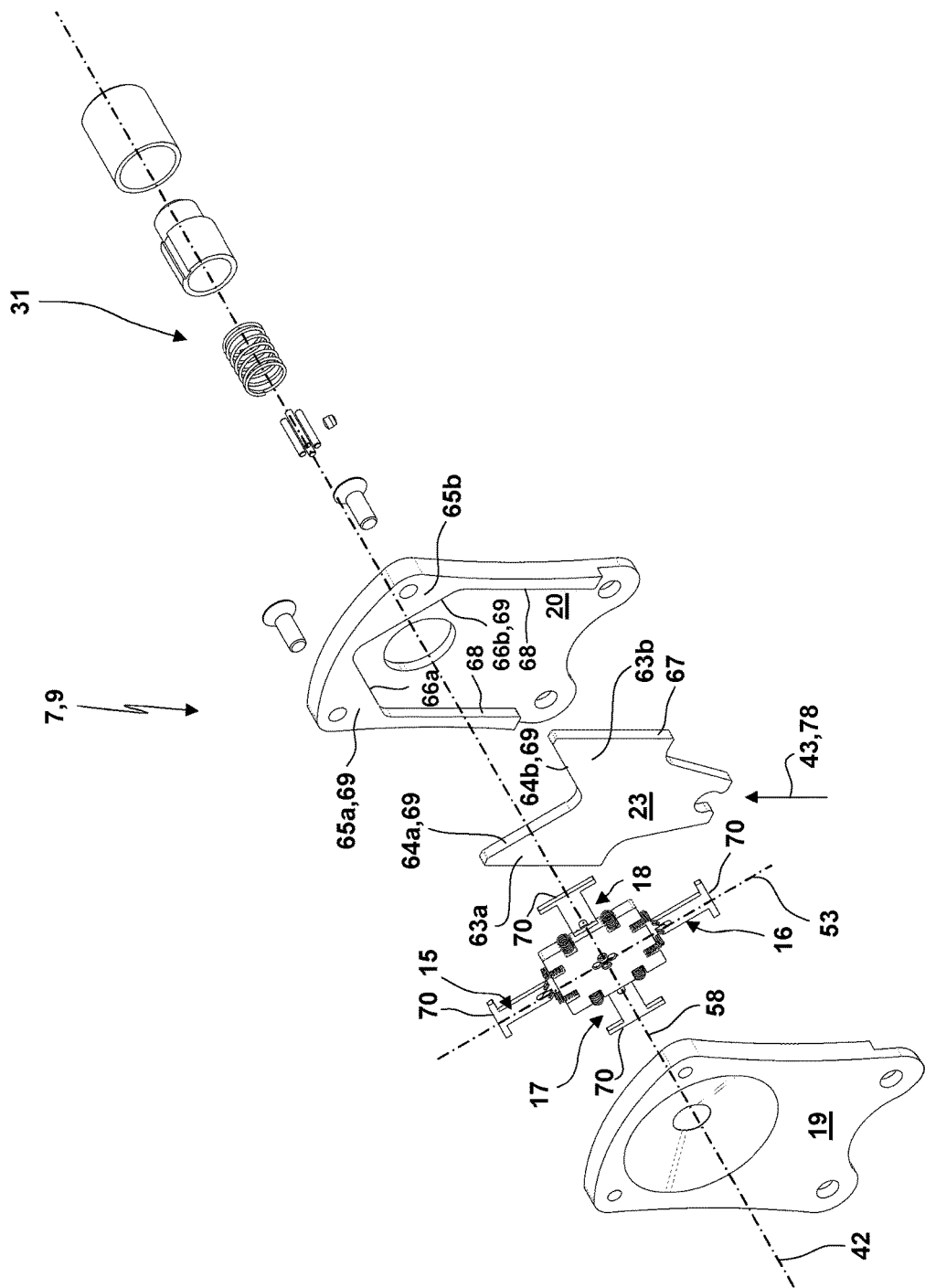
FIG. 14 shows in a three-dimensional exploded view an alternative embodiment of a pliers head.

FIG. 14 shows an alternative design of crimping pliers 9 in an exploded view. Here, a stroke of the plunger 23 is not used for inducing a rotation of an actuation ring 29. Instead, here the plunger 23 forms two actuation wedges 63a, 63b. The actuation wedges 63a, 63b form V-shaped wedge surfaces 64a, 64b. Also the cover plates 19, 20 comprise actuation wedges 65a, 65b with actuation surfaces 66a, 66b formed by the same. The plunger 23 comprising the actuation wedges 63a, 63b is guided by lateral guiding surfaces 67 for a displacement along the stroke 43 of the plunger relative to corresponding guiding surfaces 68 of the cover plates 19, 20. The wedge surfaces 64a, 64b of the plunger 23 and the wedge surfaces 66a, 66b of the cover plates 19, 20 form actuation surfaces 69 having a rhombical shape. During the stroke 43 of the plunger (which corresponds directly to a displacement direction 78 of the actuation element) the distance of opposing actuation surfaces or wedge surfaces 64a, 66b, 64b, 66a reduces. For the embodiment shown in FIG. 14 the stripping blades 15-18 are guided in an insert 70 in such way that the first pair 52 of the stripping pliers 15, 16 can only be moved in the first closing direction 53 whereas the second pair 57 of the stripping blades 17, 18 can only be moved in the second closing direction. The counter actuation surfaces 70 of the stripping blades 15-18 contact the actuation surfaces 69 on the one hand formed by the plunger 23 and on the other hand formed by the cover plates 19, 20. With a movement of the plunger 23 over the plunger stroke 43 in the displacement direction and a reduction of the distance of the opposing wedge surfaces 64a, 66b respectively 64b, 66a also the distance of the counter actuation surfaces 70 of the stripping blades 17, 18 respectively the stripping blades 15, 16 reduces so that these are actuated in closing direction.

Figure 15:
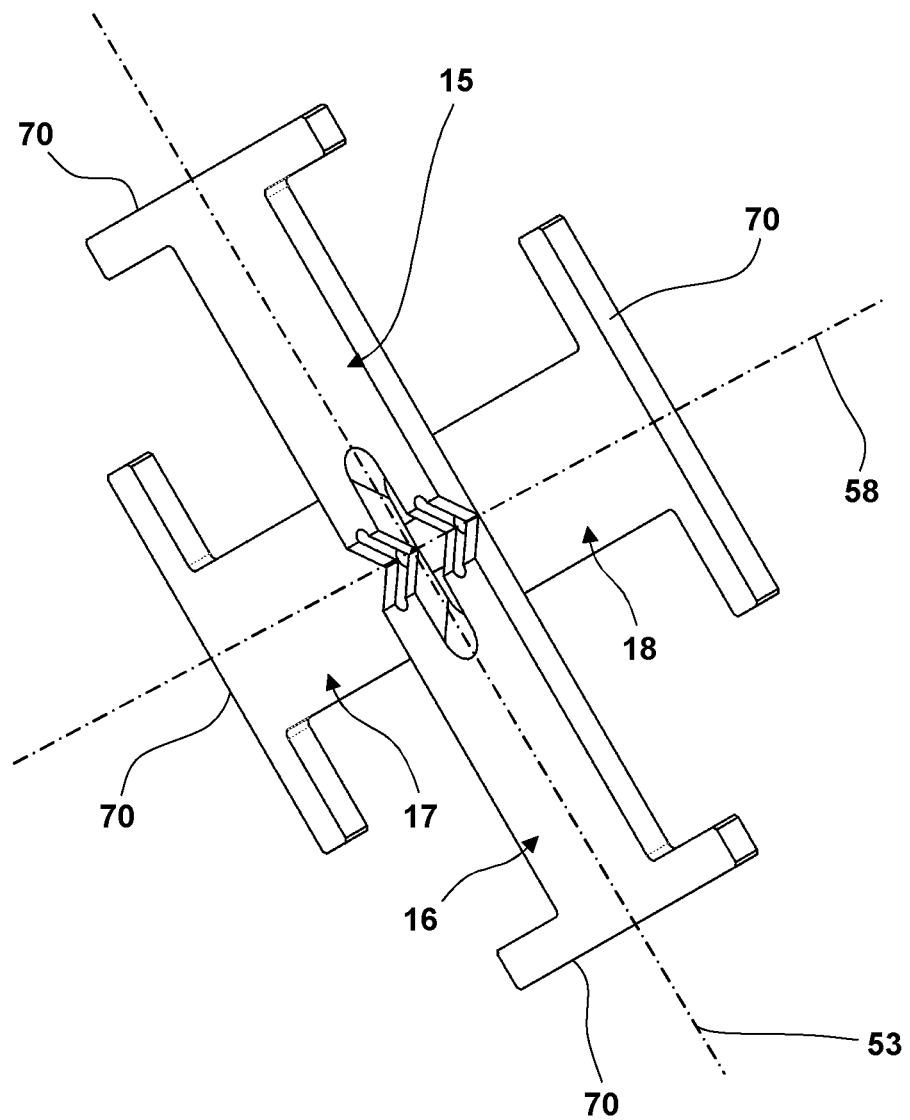
FIG. 15 shows pairs of stripping blades of the pliers head of FIG. 14.

FIG. 15 shows only the pairs 52, 57 of the stripping blades 15, 16 respectively 17, 18 with the associated closing directions 53, 58 in a three-dimensional view. Also here it can be seen that the pairs 52, 57 of the stripping blades 15, 16 as well as 17, 18 directly slide along each other. The cutting edge halves of the stripping blades 15-18 comprise a chamfer only on one side so that the cutting edge halves of the two pairs 52, 57 of the stripping blades 15-18 are arranged directly adjacent each other and move in parallel, directly adjacent planes over the closing stroke.

Figure 16:
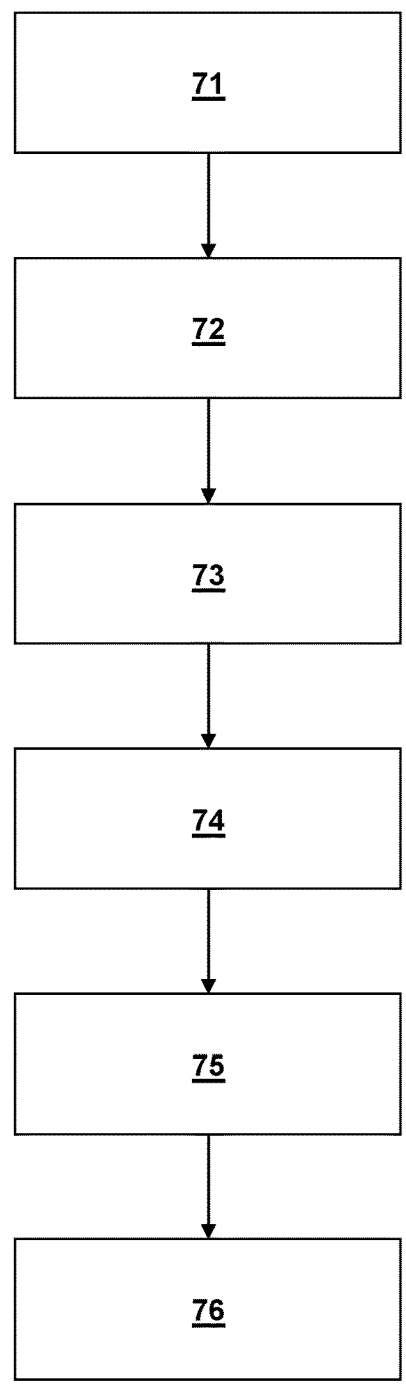
FIG. 16 in a strongly schematic view shows a method for stripping a cable comprising a plurality of conductors.

FIG. 16 as an example and in a strongly schematic representation shows a method for stripping a multi-wired cable 1:

In a method step 71 an end of an outer insulation 2 (and in some cases a protective sheet 3) is severed and pulled from the end of the conductors 4.

In a subsequent method step 72 the free ends of the conductors 4a-4d are inserted through accommodations 21a-21d into the interior of the pliers head 12. The free ends of the conductors 4a-4d are passed through the intermediate space between the front contours of the stripping blades 15-18. In the end the two ends of the conductors 4a-4d also pass through the accommodations 22a-22d and finally contact the stops 36 formed by the pins 35.

Optionally, in a method step 73 the conductors 4a-4d can be additionally fixed or clamped in the pliers head 12.

In a method step 74 the working stroke is run through. For this purpose the hand levers 10, 11 of the crimping pliers 9 are pivoted and the plunger 23 runs through the plunger stroke 43. This results (due to the rotation of the actuation ring 29 for the embodiment according to FIGS. 3 to 13 or due to the translational movement of the actuation wedges 63a, 63b for the embodiment of FIGS. 15 and 16) in the closing movement of the stripping blades 15-18. The stripping blades 15-18 in the two pairs 52, 57 slide along each other and a pair of stripping blades each cuts into the insulations of an associated pair of conductors.

In a method step 75 the hand levers 10, 11 and the stripping blades 15-18 are still left in the closed position. By pulling at the cable 1 the cable 1 is pulled out. The cut ends of the insulations of the conductors 4 are held back by the stripping blades 15-18 so that these remain in the accommodations 22a-22d.

In an optional method step 76 the ejector 31 can be actuated which leads to the ejection of the pulled-off ends of the insulation 5 of the conductors 4.

As explained in the beginning, for the generation of the driving movement of the stripping blades any drive mechanism 14 can be used where it is not necessarily required that actuation wedges or an actuation ring is used. In the following only some examples for a drive mechanism for the stripping blades 15-18 which might also be used are mentioned:

It is possible that a translational movement of the plunger is generated by a toggle lever drive as the toggle lever drives described in the publications DE 19 713 580 C2 (corresponding to U.S. Pat. No. 5,913,933 A) or DE 19 807 737 C2 (corresponding to U.S. Pat. No. 6,026,671 A), DE 298 03 336 U1.

It is also possible that an actuation of an actuation ring via hand levers is directly provided by an actuation ring fixed to one of the hand levers, cp. DE 10 2005 003 615 B3 and DE 10 2005 003 617 B3.

Another option for a driving connection for rotating an actuation ring is described in DE 10 2011 052 967 B4.

Generally possible is also the rotation of an actuation ring by a ratchet transmission as e.g. described in the patent application EP 3 159 088 A1.

For one embodiment for driving an actuation ring via an interposed force-spring-compensation element reference is made to the publication EP 3 012 924 A1 (corresponding to U.S. Pat. No. 9,583,904 B2).

Another drive mechanism for driving an actuation ring via hand levers is disclosed in EP 2 905 848 A1 (corresponding to U.S. Pat. No. 9,242,349 B2).

EP 2 672 580 A1 discloses the driving of a plunger via a toggle lever drive.

The movement of the stripping blades 15, 16, 17, 18 is coupled with each other in such a way that the stripping blades 15, 16, 17, 18 move together and to the same extent. For the shown embodiments the coupling of the movement of the stripping blades 15, 16, 17, 18 is provided by the contact of the actuation surfaces 48, 69 of the actuation element (in particular the actuation ring 29 or the actuation wedge 63) with the counter actuation surfaces 47, 70 of the stripping blades 15, 16, 17, 18.

It is possible that in the multi-wired cable 1 all of the conductors 4 have the same cross sections. In this case also the cutting edge halves 55 of the stripping blades 15, 16; 17, 18 have the same contours. However, it is also possible that the conductors 5 have differing cross sections. To mention only one non-limiting example the cable having four conductors comprises conductors with a cross section of 0114 mm², 0.25 mm², 0.35 mm² and 0.5 mm². In this case the contours of the cutting edge halves 55 of the stripping blades 15, 16; 17, 18 comprise differing corresponding radii. In this case it is possible that the single cutting edge halves 55 are provided with different labels at the stripping blades 15, 16; 17, 18 in order to guarantee the unambiguous assignment of the conductors to the associated diameters of the cutting edge halves. In the case that the differing conductors are labeled with different colors, these colored labels can also be used for labeling the differing cutting edge halves.

For the shown embodiments the cutting edge halves have each been equipped with an approximately semi-circular contour of the cutting edge halves. However, it is also possible that the cutting edge has a different contour. It is e.g. possible that the contours of the cutting edge halves are straight so that these then do not cut the half of the circumference of an insulation of a cable but only generate a straight cutting of the outer surface of the insulation. If an elastic element is interposed in the drive mechanism 14 between the hand levers 10, 11 and the stripping blades 15, 16; 17, 18, with stripping blades 15, 16; 17, 18 of this type with straight cutting edges it may also be possible to process conductors having differing diameters with an adaptation by the elastic element: In this case in the beginning the stripping blades 15, 16; 17, 18 cut into the insulation 5 of the conductor 4. If then the cutting edge halves contacts the harder wire 6, the further movement of the hand levers 10, 11 does not lead to movement of the stripping blades but to an elastic bias of the spring element. Instead, other conductors which in some cases have differing diameters can still be further cut in the region of the insulation.

According to the patent claims the conductors of the cable are "simultaneously" stripped and the cutting blades "simultaneously" cut into the insolation of the conductors. This means that all of the conductors are stripped in the same processing step and in particular in the same working stroke of the stripping tool. Here, during one and the same working stroke the cutting blades might cut at the same time and/or with the same cutting depth in the associated conductors or might cut at different times and/or with different cutting depth in the conductors. Instead, the invention does not cover an embodiment wherein in a first processing step (in particular a first working stroke) first conductors of a cable are cut and stripped, then the cable is repositioned such that second conductors of the same cable a inserted into the same or different accommodations and/or between the same or different cutting blades and in the end the second conductors of the cable are cut and stripped in a second processing step (in particular a second working stroke).

Many variations and modifications may be made to the preferred embodiments of the invention without departing substantially from the spirit and principles of the invention. All such modifications and variations are intended to be included herein within the scope of the present invention, as defined by the following claims.

We claim:

1. A stripping tool for simultaneously stripping a cable having at least four conductors,
   the stripping tool comprising a first pair of stripping blades with a first stripping blade and a second stripping blade, the first stripping blade comprising two cutting edge halves and a first recess, and the second stripping blade comprising two cutting edge halves and a second recess, said two cutting edge halves of the first stripping blade and said two cutting edge halves of the second stripping blade joining to two separate cutting edges, the two separate cutting edges being designed and configured for cutting from different sides into insulations of two different conductors of the cable, and the stripping tool comprising a second pair of stripping blades with a third stripping blade and a fourth stripping blade, the third stripping blade comprising two cutting edge halves and a third recess, and the fourth stripping blade comprising two cutting edge halves and a fourth recess, said two cutting edge halves of the third stripping blade and said two cutting edge halves of the fourth stripping blade joining to two separate cutting edges, the two separate cutting edges being designed and configured for cutting from different sides into insulations of two different conductors of the cable differing from the two conductors simultaneously cut by the first pair of stripping blades,
   wherein the first stripping blade, the second stripping blade, the third stripping blade and the fourth stripping blade are coupled by a drive mechanism to a drive for being simultaneously moved by the drive over a working stroke of the stripping tool and
   the first stripping blade, the second stripping blade, the third stripping blade and the fourth stripping blade are guided by a tool head such that
   the first stripping blade and the second stripping blade move in a first plane relative to each other in a first closing direction and
   the third stripping blade and the fourth stripping blade move in a second plane relative to each other in a second closing direction, said first closing direction differing from said second closing direction.

2. The stripping tool of claim 1, wherein the first plane and the second plane are arranged directly adjacent to each other and/or have an orientation parallel to each other.

3. The stripping tool of claim 2, wherein
   the cutting edge halves of the first stripping blade and the cutting edge halves of the second stripping blade are arranged on the side of the respective stripping blade facing towards the second plane and
   the cutting edge halves of the third stripping blade and the cutting edge halves of the fourth stripping blade are arranged on the side of the respective stripping blade facing towards the first plane.

4. The stripping tool of claim 1, wherein
   the drive mechanism comprises an actuation element having actuation surfaces,
   the first stripping blade, the second stripping blade, the third stripping blade and the fourth stripping blade each comprise a counter actuating surface which contacts an associated actuation surface of the actuation element,
   the actuation element is moved relative to the tool head over the working stroke in an actuation direction and
   the actuation surfaces of the actuation element are inclined relative to the actuation direction.

5. The stripping tool of claim 4, wherein
   the actuation element comprises an actuation ring,
   the drive rotates the actuation ring over the working stroke so that the actuation direction is a circumferential direction of the actuation ring and
   the actuation surfaces are inclined relative to the circumferential direction.

6. The stripping tool of claim 4, wherein
   the actuation element comprises an actuation wedge,
   the actuation direction is a displacement direction of the actuation wedge,
   a wedge surface of the actuation wedge forms the actuation surface and
   the wedge surface is inclined relative to the displacement direction.

7. The stripping tool of claim 1, wherein accommodations for the conductors are provided.

8. The stripping tool of claim 7, wherein the accommodations comprise stops for defining the depth of insertion of the conductors into the accommodations.

9. The stripping tool of claim 1, wherein an ejector is provided, said ejector being designed and configured for ejecting an insulation severed by the stripping tool out of the stripping tool.

10. The stripping tool of claim 8, wherein an ejector is provided, said ejector being designed and configured for ejecting an insulation severed by the stripping tool out of the stripping tool.

11. The stripping tool of claim 10, wherein
    the ejector comprises the stops for defining the depth of insertion of the conductors into the accommodations and
    the ejector moves at least one stop for ejecting an end of an insulation severed by the stripping tool.

12. The stripping tool of claim 1, wherein at least one of the first stripping blade, the second stripping blade, the third stripping blade and the fourth stripping blade comprises a supporting surface for a spring base of a return spring.

13. The stripping tool of claim 1, wherein said first recess of the first stripping blade having an open edge, said first recess being arranged between the cutting edge halves of the first cutting blade and said first recess being dimensioned such that one of said at least four conductors is able to pass through the first recess without being cut by the first stripping blade and the second stripping blade.

\* \* \* \* \*